United States Patent [19]

Carmine et al.

[11] Patent Number: 5,437,718
[45] Date of Patent: Aug. 1, 1995

[54] NAPHTHENIC ACID ESTERS AS DISPENSING AGENTS FOR PIGMENT ADDITIVES AND PRODUCTS INCORPORATING SAME

[75] Inventors: James L. Carmine, Laguna Niguel, Calif.; Rose A. Ryntz, Clinton Township, Macomb County, Mich.

[73] Assignee: Akzo Nobel N.V., SB Arnhem, Netherlands

[21] Appl. No.: 305,548

[22] Filed: Sep. 14, 1994

Related U.S. Application Data

[62] Division of Ser. No. 14,213, Feb. 5, 1993, Pat. No. 5,383,965.

[51] Int. Cl.$^6$ ............................................. C09C 3/10
[52] U.S. Cl. ........................... 106/287.24; 106/472; 106/476; 106/477; 106/504; 106/505; 524/317
[58] Field of Search ................... 524/317; 106/287.24, 106/472, 476, 477, 504, 505

Primary Examiner—Mark L. Bell
Assistant Examiner—Scott L. Hertzog
Attorney, Agent, or Firm—Ralph J. Mancini; Louis A. Morris

[57] ABSTRACT

The present invention provides for novel pigment-dispersant compositions, incorporating various pigments, such as for example carbon blacks, comprising dispersants which are esters of naphthenic acid, and higher and lower analogs thereof. The invention also provides for, processes for the preparation thereof and coating and rubber compositions comprising same. The dispersing agents employed the present invention have been found to be particularly useful as dispersing agents for conductive carbon black and other pigments.

9 Claims, No Drawings

NAPHTHENIC ACID ESTERS AS DISPENSING AGENTS FOR PIGMENT ADDITIVES AND PRODUCTS INCORPORATING SAME

This is a division of application Ser. No. 08/014,213 filed Feb. 5, 1993 now U.S. Pat. No. 5,383,965.

BACKGROUND OF INVENTION

This invention relates to the use of esters of naphthenic acids and the higher or lower molecular weight analogs thereof, as dispersing agents for pigment additives such as carbon blacks, and encompasses pigment-dispersant compositions, processes of preparation thereof and coating and rubber compositions comprising a pigment thus dispersed. The dispersants of the present invention permit the preparation of various pigment dispersions which may be employed without adverse effects on the finished coatings or rubbers into which such dispersions may be incorporated.

One of the most difficult pigments to disperse and stabilize in a waterborne coating formulations or rubber compositions is carbon black, because of its enormous surface area and high oil absorption. Additionally, especially where a conductive carbon black pigment is to be utilized, it is important that the reduction of the electrostatic properties be minimized, and that the other physical characteristics of the final coating are not deleteriously affected by the particular pigment dispersant employed.

Naphthenic acid has been employed as a dispersing agent in printing inks where it has been shown to be a good dispersant for carbon black, and where it can improve fluidity and decrease clogging and gumming tendencies. (Lowar, Spec. Chem., April, 1989) Also, reference has been made in the art to the use of metal soaps of this acid as usable in the manufacture of pigments for paint, glazes, etc. (Kirk-Othmer's Encyclopedia of Chemical Technology, Volume 9, p. 245). However, the applicants know of no prior art reference directed to the use of esters of naphthenic acids as dispersants.

The products commonly employed in the prior art as carbon black dispersants in coatings are salts of an acrylic acid copolymer, acetylenic diol surfactants, or polyalcohol ethers which fit into various classes of wetting and dispersing agents, (Calbo, Handbook of Coatings Additives, Dekker pg. 516). Such additives could be called on to function as more than a dispersant and can also act in one or more of the following ways:
a) to prevent flocculation
b) to prevent hard settling
c) to improve jetness/color/gloss
d) to control viscosity, and/or
e) to improve wetting of the base resin.

Various considerations are important in determining the usefulness of any additive as a dispersing agent for use with a carbon black or with other pigments, depending upon the product into which such a dispersion is to be incorporated.

When used throughout this application the terms pigment(s) or pigment dispersion(s) are intended to encompass various materials which may be intended to impart either color and/or serve some other function, such as for example the use of carbon black in rubber where, in addition to adding color, such also acts as a reinforcing agent.

One of the most important considerations in determining whether a particular dispersant will be useful for use with a given pigment or pigments when such a pigment is to be used in a paint or coating composition is whether such a dispersant/pigment combination will or will not impart a conductive nature or characteristic to the dried paint film or coating into which it has been added.

The automotive industry is replacing and will continue to replace exterior metal body panels on vehicles with plastic and composite body panels. Some reasons for this change are weight reduction, flexibility of design, and lower tooling costs. The replacement of metal body panels by plastics and composites is not without difficulties.

One problem of note is the electrostatic spray painting of plastics. Electrostatic spray painting is the preferred manner of applying automotive topcoats. Spray painting normally gives the best appearance to the vehicle and the electrostatic technique assures the most economical use of the material. The problem arises because plastics do not paint well electrostatically unless a conductive primer is used.

Amongst the most important considerations for determining the utility of any dispersant to be used in conjunction with conductive carbon blacks are the following:
the inherent rheological stability of the dispersion, both alone and when added to a formulated paint;
resistance to flocculation of the carbon black/dispersant mixture and in the final paint or coating; and
ability to achieve low viscosity at high pigment loadings.

The various prior art references of which the applicants are aware which relate to dispersing agents for pigment additives, such as carbon blacks, suffer from a number of shortcomings.

The most significant shortcomings of the carbon black dispersants of the prior art, including those used for conductive carbon blacks, are:
high levels of dispersant may be required which tends to detrimentally affect the physical properties of formulated paints, such as adversely affecting the resultant humidity resistance, yellowing upon exposure to UV light, loss of cure in melamine cross-linked systems, and other undesirable effects;
inability to prevent reflocculation of carbon black, resulting in the loss of electrical conductivity in dried paint films; and
incompatibility of the dispersant with the particular resin system selected for use in the final paint formulation.

The shortcomings of the prior art dispersing agents noted above may be overcome by employing certain naphthenic acid esters in accordance with the present invention.

It is therefore an object of the present invention to provide for novel carbon black and other pigment dispersions.

It is also an object of the present invention to provide a process for the preparation of pigment dispersions comprising the dispersants of the present invention for use in various coatings and rubbers.

It is a further object of the present invention to provide for improved coatings and rubbers incorporating the dispersants and dispersions taught herein.

It is another object of the present invention to provide an improved process for the production of various conductive coatings comprising the use of the dispersants an dispersions of the present invention.

Lastly, it is an object of the present invention to provide an improved process for the production of rubber compositions comprising the use of the dispersants and dispersions of the present invention.

These and other objects of the invention will be reflected in the course of the following for more detailed discussion.

SUMMARY OF THE INVENTION

The present invention relates to novel dispersing agents for pigment additives, such as for example carbon blacks, comprising esters of naphthenic acid, and higher and lower analogs thereof. The invention also encompasses pigment-dispersant compositions and processes for the preparation thereof, as well as coating and rubber compositions comprising same.

It is anticipated that the dispersants of the present invention will be most effective when used to disperse various organic pigments.

The dispersing agents of the present invention have been found to be particularly useful as dispersing agents for carbon black and other similar organic pigments. Naphthenic acid ester dispersants exhibit the following advantages, particularly when used with conductive carbon black pigments:

excellent flocculation resistance of the dispersed black pigment;
increased grinding efficiency;
inherant rheological stability, that is low viscosity at high pigment loading;
excellent dry film conductivity; and
the humidity resistance of the formulated paint or film is not materially affected by use of claimed dispersants.

These and other features and advantages of the present invention will be more readily appreciated from the following more detailed description of the invention.

DETAILED DESCRIPTION OF THE INVENTION

The dispersants of present invention which have been found to be particularly useful as dispersing agents for carbon blacks and other pigments are certain esters of naphthenic acids and the higher and lower analogs thereof.

These compounds generally have the chemical formula:

$$X-O-(CH_2CHO)_n-\underset{R}{\overset{\overset{O}{\|}}{C}}-R'$$

where
R' = a naphthene group containing one or more alkylated cyclopentane and/or cyclohexane ring(s), and
where
R = H or CH$_3$,
where
n = 1–6, and
X = H or

Generally, —R' can be represented by the formula:

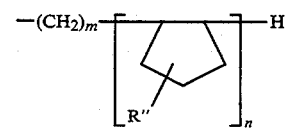

where m is greater than 1, preferably greater than 4 and less than 10, and
where the number of fused rings, n, may range from 1 to 5 and a small fraction of these rings may be cyclohexyl. R' consists of at least C$_1$-C$_3$ aliphatic groups.

More particularly, R' may be a naphthene group containing one or more ring structures selected from the group comprising methylcyclopentane, 1,2-dimethylcyclopentane and methylcyclohexane.

Generally speaking, it is contemplated that a variety of esters of various naphthenic acids will find utility as dispersants in accordance with the teachings of the present invention depending upon the compatibility of the particular naphthenic acid ester or esters and the pigment/coating or pigment/rubber system in which such is to be incorporated.

Naphthenic acids are described in Kirk-Othmer's Encyclopedia of Chemical Technology, Third Edition, Volume 15, pp. 749–753, especially pp. 749–750, John Wiley & Sons 1981, the disclosure of which is incorporated herein by reference.

Naphthenic acids are well known to the art and are available commercially, primarily as the result of various extractive procedures carried out in refining naturally occurring petroleums and petroleum fractions, particularly gas-oil distillates boiling in the range of 400°–700° F. Naphthenic acids are found particularly in petroleums originating in the western part of the United States, especially in California; in the northern part of South America, especially Venezuela, Columbia and Aruba; in the southern part of Europe, especially Rumania and to a lesser extent, in crude oils originating in Louisiana, along the Texas gulf coast, in Peru, Mexico, Poland, the Soviet Union and Germany.

The chemical nature of these naphthenic acids is more or less ill-defined, but they all have in common the characteristic of possessing alicyclic nuclei. These may be five or six membered carbon atom ring systems, various condensed ring systems, and other related materials as disclosed in Fieser, "Organic Chemistry," 3rd ed. 1956, pp. 97–98.

Various acid esters may be formed from the aforementioned class of naphthenic acids, by subjecting such acids to a well known esterification reaction which will be familiar to one skilled in this art, and requires no further elucidation here.

The specific acid esters formed will be a function of the particular naphthenic acid or mixture of naphthenic acids utilized and the esterification reactant employed. Such reactants are typically alcohols having 1–12 carbon atoms, and 1 to 4 OH groups.

Amongst the preferred alcohols are diols having a mixed ether backbone, such as for example, 1,6-hexane diol and the like; triols, such as aliphatic triols having up to 10 carbon atoms, for example, trimethylolpropane, and monofunctional alcohols such as for example, methanol, propanol, butanol, and the like. Other preferred alcohols are: 2-ethyl-1,3-hexanediol tetraethylene glycol, dipropylene glycol, tripropylene glycol, propylene glycol, and 1,5-pentanediol.

The esters employed, in the present invention are preferably "half-acid esters", such as TGN ester, wherein one end of the molecule acts as an anchor to be compatible with the resin, while the other end of the molecule acts as a surfactant to wet out the pigment.

Preferred naphthenic acid esters are prepared from mixed isomers of cyclic aliphatic carboxylic acids, wherein the rings are mixed $C_5/C_6$ rings, having short, that is to say $C_1$-$C_3$, aliphatic side chains each of which will have a terminal carboxylic acid group, and isomers thereof.

Of particular interest is the ester of naphthenic acid, triethylene glycol naphthenate (TGN) which has the following structure:

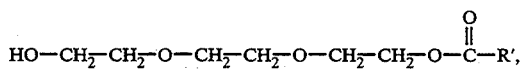

wherein R'=the naphthene group containing an alkylated cyclopentane and/or cyclohexane ring(s).

The general physical properties of TGN ester are the following:

| Appearance | Amber Liquid |
| --- | --- |
| Color | Gardner 10, Max. |
| Specific Gravity @ 24° C. | 1.00 |
| Viscosity @ 100° F. | 42 cs. |
| Flash Pt. | 395° C. |
| Pour Pt. | −21° C. |
| Acid Number mg KOH/g | 10, Max. |
| Saponification Number | 135 |
| Hydrophile-Lipophile Balance (HLB) Value | 7.2 |

Also, TGN ester is soluble in various organic solvents, included mineral spirits, toluene, ethyl acetate, isopropanol and methanol, that is, solvents which span the solubility parameter range of 7.7 to 14.5 cal ½ cm-3/2, and are suitable for coatings formulations.

This material is commercially available from MERICHEM under the tradename Napester T ™ and from AKZO Chemicals, Inc. under the tradename Victaperse ™.

The naphthenic acid ester dispersants of the present invention have been found to have particular utility as dispersants for conductive carbon black pigments for use in conductive prime films and coatings, where it is known that optimum conductivity depends upon, among other parameters, good dispersion.

Over-dispersion can result in a diminished conductivity by shearing and destroying chains through which electrons can travel.

A problem that is frequently encountered in the formulation of a conductive primer is the loss of dry-film conductivity as the film or coating ages. This defect is attributed to postwetting of the carbon black pigment by the vehicle or additives, thereby insulating the particles from each other. Insulation, and hence loss of dry-film conductivity, can also be encountered through the dispersion process if the dispersant (surfactant in aqueous systems) or vehicle chosen for the millbase is "too efficient" at wetting the carbon black aggregates.

A loss in dry-film conductivity can also be attributed to reflocculation of the carbon black aggregates in the wet paint due to incomplete or "unstable" dispersion of the carbon black aggregates, It has been found that naphthenic acid esters having a hydrophile-lipophile balance (HLB) of 6 to 10 provide a stable, humidity insensitive coatings that maintain dry film conductivity after accelerated aging conditions. Preferred naphthenic acid esters will generally have HLB's of from about 7-9. The most preferred range will be from about 7-8.

Generally, the use of the dispersants of the present invention will allow one to achieve a higher effective incorporation of pigment per unit volume of coating without over mixing and therefore allow one to preserve the desirable characteristics of the pigment being utilized.

When employed as a dispersant for carbon black for incorporation in a conductive coating compositions the amount of naphthenic acid esters, such as triethylene glycol naphthenate, to be utilized to effectively disperse the pigment, while maximizing the conductivity of the coating, will vary from greater than 0 to 5 weight percent based upon the weight of carbon black. More preferably from about 0.9 to 4.8 weight percent based upon the weight of carbon black utilized, will be employed.

In effect, the preferred dispersions of the present invention would allow one to achieve a greater effective dispersion of conductive carbon black per unit of dispersant than would other available prior art dispersants.

Thus, a given quantity of dispersant will tend to disperse an optimum amount of conductive carbon black pigment without effecting the breakdown of the structure of the carbon black, which is a function of the amount of mixing required to disperse the pigment, and therefore will generally yield a higher conductivity and provide optimum dry film conductivity.

Generally, it is expected that one will achieve a higher level of pigment incorporation into elastomeric compositions, such as rubber compositions, than would otherwise be possible using prior art dispersants.

One generally incorporates pigments in rubber compositions as reinforcing agents or to impart conductivity.

The advantages to be achieved via the use of the dispersants of the present invention versus known prior art dispersants for conductive carbon black which is incorporated into various elastomeric materials, such as rubbers, will be commensurate with those which have been shown for conductive carbon black pigments in various coating compositions.

When employed as a dispersant for the incorporation of organic pigments such as carbon black into various elastomeric compositions, it has been found that optimum results can be obtained using from about greater than 0 to about 10 weight percent of dispersant based upon the total weight of pigment to be dispersed in the elastomeric composition.

Preferably from about 1–7 weight percent dispersant based upon the total weight of pigment will be employed and more preferably from about 2–3 weight percent will be used.

The foregoing general discussion of the present inventions will be further illustrated by the following specific examples.

EXAMPLES

Examples 1-4

Into a quart plastic screw cap bottle filled with 355 pares of 6 mm glass beads was placed the following ingredients in order (parts refer to gram weights):

| COMPONENT | EXAMPLE NO. | | | |
|---|---|---|---|---|
| | 1 Control | 2 | 3 | 4 |
| | PARTS | | | |
| Acetylene Black | 8.0 | 8.0 | 8.0 | 8.0 |
| Microtalc | 7.5 | 7.5 | 7.5 | 7.5 |
| Acrylic Latex (50% NV) | 53.7 | 53.7 | 53.7 | 53.7 |
| N-Methylpyrrolidone | 6.8 | 6.8 | 6.8 | 6.8 |
| Butyl Carbitol | 6.8 | 6.8 | 6.8 | 6.8 |
| Deionized water | 16.1 | 16.1 | 16.1 | 16.1 |
| Triethylamine | 1.32 | 1.32 | 1.32 | 1.32 |
| Aqueous Ammonia (29%) | 1.0 | 1.0 | 1.0 | 1.0 |
| triethylene glycol naphthenate | 0 | 0.08 | 0.20 | 0.40 |
| Imino methylated melamine | 54.8 | 54.8 | 54.8 | 54.8 |
| Polyurethane Dispersion resin (35% NV) | 84.5 | 84.5 | 84.5 | 84.5 |

The above components were placed on a shaker mill and allowed to agitate for the following times at which Hegman grind readings were taken:

| TIME OF GRIND | HEGMAN GRIND READING | | | |
|---|---|---|---|---|
| 20 minutes | 2 | 3.2 | 3.5 | 4.25 |
| 30 minutes | 3 | 4 | 4 | 5 |
| 40 minutes | 4 | 4.75 | 4.75 | 5.5 |
| 50 minutes | 4.5 | 5 | 5 | —* |

*the grind time to reach 5.5 Hegman was 35 minutes in this example.

The dispersions from above were then let down with the following ingredients:

| COMPONENT | PARTS | | | |
|---|---|---|---|---|
| Polyurethane dispersion resin (35% NV) | 84.5 | 84.5 | 84.5 | 84.5 |
| Deionized water | 5.0 | 5.0 | 5.0 | 5.0 |

The physical constants of the above formulated paints are shown in the following Table 1. Constants were measured on paints that were applied to Budd DSM950 SMC (Sheet molded compound) by conventional air atomized siphon gun spray application. Bake on the coatings was 280 degrees Fahrenheit for 30 minutes. A second coat of the primer was then applied over one half of the ambient cooled panel by the same application method and baked according to the same oven schedule. A conventional solvent borne high solids basecoat/clearcoat was applied to the bottom half of the panel (leaving the upper half of the panel exposed with the primer in one and two coats) in the same application method (at a basecoat thickness of 0.8 dry mils and wet-on-wet application of a clearcoat at 1.8 dry mils) and baked 30 minutes at 250 degrees Fahrenheit.

TABLE 1

PHYSICAL PROPERTIES OF CURED PAINT FILMS

| | PAINT OF EXAMPLE | | | |
|---|---|---|---|---|
| | 1 | 2 | 3 | 4 |
| Dry film primer thickness (mils): | | | | |
| first coat | 1.0 | 0.9 | 0.9 | 1.0 |
| second coat | 0.9 | 1.0 | 1.0 | 1.0 |
| Dry film primer conductivity Ransberg units | 165+ | 165+ | 165+ | 165+ |
| Primer gloss (60 degree meter) | 38 | 38 | 38 | 38 |
| Initial crosshatch adhesion (% retained): | | | | |
| (primer to substrate) | 100 | 100 | 100 | 100 |
| (primer to primer) | 100 | 100 | 100 | 100 |
| (topcoat to primer) | 100 | 100 | 100 | 100 |
| Crosshatch adhesion after exposure to 100% relative humidity for 48 hours: | | | | |
| (primer to substrate) | 100 | 100 | 100 | 100 |
| (primer to primer) | 100 | 100 | 100 | 100 |
| (topcoal to primer) | 100 | 100 | 100 | 100 |

The net effect of the triethylene glycol naphthenate dispersant was to lower the amount of time required to attain a suitable grind of the conductive carbon black pigment without deleterious effects on the physical properties of the dry paint film.

It is also noted that triethylene glycol naphthenate is considered a good dispersant in that it wets the pigment without nullification of the conductivity. It has been found that dispersants which in the past allowed one to shorten the effective grind time, also destroyed the conductive nature of the pigment.

Examples 5-7

Comparative Examples

Into a quart plastic screw cap bottle filled with 355 parts of 6 mm glass beads was placed in the following ingredients in order (parts refer to gram weights):

| COMPONENT | EXAMPLE | | |
|---|---|---|---|
| | 5 | 6 | 7 |
| | PARTS | | |
| Acetylene Black | 8.0 | 8.0 | 8.0 |
| Microtalc | 7.5 | 7.5 | 7.5 |
| Acrylic Latex (50% NV) | 53.7 | 53.7 | 53.7 |
| N-Methylpyrrolidone | 6.8 | 6.8 | 6.8 |
| Butyl Carbitol | 6.8 | 6.8 | 6.8 |
| Deionized water | 16.1 | 16.1 | 16.1 |
| Triethylamine | 1.32 | 1.32 | 1.32 |
| Aqueous Ammonia (29%) | 1.0 | 1.0 | 1.0 |
| Surfynol 104 | 0.4 | 0 | 0 |
| Surfynol GA | 0 | 0.4 | 0 |
| Surfynol TG | 0 | 0 | 0.4 |

-continued

| COMPONENT | EXAMPLE | | |
|---|---|---|---|
| | 5 | 6 | 7 |
| | PARTS | | |
| Imino methylated melamine | 54.8 | 54.8 | 54.8 |
| Polyurethane Dispersion resin (35% NV) | 84.5 | 84.5 | 84.5 |

The above components were placed on a shaker mill and allowed to agitate for the following times at which hegman grind readings were taken:

| TIME OF GRIND | HEGMAN GRIND READING | | |
|---|---|---|---|
| 20 minutes | 2 | 3 | 3.5 |
| 30 minutes | 3 | 4 | 4.25 |
| 40 minutes | 4 | 4 | 4.5 |
| 50 minutes | 4.5 | 5 | 5 |

The dispersions from above were then let down with the following ingredients:

| COMPONENT | PARTS | | |
|---|---|---|---|
| Polyurethane dispersion resin (35% NV) | 84.5 | 84.5 | 84.5 |
| Deionized water | 5.0 | 5.0 | 5.0 |

The physical constants of the above formulated paints are shown in the following Table 2, Constants were measured on paints that were applied to Budd DSM950 SMC (Sheet molded compound) by conventional air atomized siphon gun spray application, Bake on the coatings was 280 degrees Fahrenheit for 30 minutes, A second coat of the primer was then applied over one half of the ambient cooled panel by the same application method and baked according to the same oven schedule. A conventional solvent borne high solids basecoat/clearcoat was applied to the bottom half of the panel (leaving the upper half of the panel exposed with the primer in one and two coats) in the same application method (at a basecoat thickness of 0.8 dry mils and wet-on-wet application of a clearcoat at 1.8 dry mils) and baked 30 minutes at 250 degrees Fahrenheit.

TABLE 2

| PHYSICAL PROPERTIES OF CURED PAINT FILMS | | | |
|---|---|---|---|
| | PAINT OF EXAMPLE | | |
| | 5 | 6 | 7 |
| Dry film primer thickness (mils): | | | |
| first coat | 1.0 | 0.8 | 0.9 |
| second coat | 0.9 | 1.0 | 1.0 |
| Dry film primer conductivity Ransberg units | 140 | 155 | 165 |
| Primer gloss (60 degree meter) | 38 | 38 | 38 |
| Initial crosshatch adhesion (% retained): | | | |
| (primer to substrate) | 100 | 100 | 100 |
| (primer to primer) | 100 | 100 | 100 |
| (topcoat to primer) | 100 | 100 | 100 |
| Crosshatch adhesion after exposure to 100% relative humidity for 48 hours: | | | |
| (primer to substrate) | 0 | 0 | 0 |
| (primer to primer) | 0 | 0 | 0 |
| (topcoat to primer) | 100 | 100 | 100 |

The net effect of the Surfynol dispersants was not as good as the triethylene glycol naphthenate in either lowering the grind times needed to achieve the desired particle size or in providing a humidity insensitive coating.

The dispersants also seemed to be detrimental to final dry film conductivity versus the triethylene glycol naphthenate. This is probably due to flocculation of the pigment in the wet paint as indicated by the poor grind development over time versus the triethylene glycol naphthenate.

While a limited number of preferred embodiments of the present invention have been described and tested above, one skilled in the art will, nevertheless, recognize numerous substitutions, modifications and alterations which can be made without departing from the spirit and scope of the invention as limited by the following claims.

We claim:

1. An improved rubber composition which comprises rubber and a pigment dispersion comprising a normally solid pigment component and an ester of naphthenic acid, having the general formula:

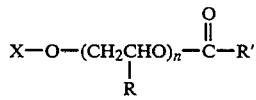

where
R' = a naphthene group containing one or more alkylated cyclopentane and/or cyclohexane ring(s), and
where R = H or CH$_3$,
where n = 1-6, and
X = H or

2. The rubber composition of claim 1 wherein in said pigment dispersion, R' is a naphthene group containing one or more ring structures selected from the group consisting of methylcyclopentane, 1,2- dimethylcyclopentane and methylcyclohexane.

3. The rubber composition of claim 1 wherein in said pigment dispersion, R' is a naphthene group having the general formula:

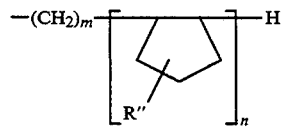

where m is greater than 1, and
where the number of fused rings, n, may range from 1 to 5 and a small fraction of these rings may be cyclohexyl, and where R" consists of a C$_1$-C$_3$ aliphatic group.

4. The rubber composition of claim 1 wherein in said pigment dispersion, the dispersant is an ester of naphthenic acid having the chemical formula:

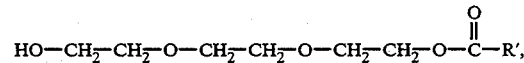

wherein R'=the naphthene group containing one or more alkylated cyclopentane and/or cyclohexane ring(s).

5. The rubber composition of claim 1 wherein said pigment dispersion comprises a carbon black as the pigment and triethylene glycol naphthenate as a dispersant.

6. The rubber composition of claim 1 wherein said pigment dispersion comprises a conductive carbon black as a pigment and triethylene glycol naphthenate as a dispersant.

7. A process for preparing an improved rubber composition comprising adding to a base rubber composition a pigment dispersion comprising a normally solid pigment component and an ester of naphthenic acid, having the general formula:

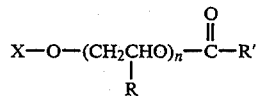

where R'=a naphthene group containing one or more alkylated cyclopentane and/or cyclohexane ring(s), and
where R=H or CH$_3$,
where n=1-6, and
X=H or

8. The process of claim 7 wherein said dispersion comprises a conductive carbon black as a pigment and triethylene glycol naphthenate as a dispersant.

9. A process for preparing an improved rubber composition comprising adding to a base rubber composition an amount of a pigment dispersion effective to achieve optimum incorporation of the pigment without effecting the desirable pigment characteristics, wherein said pigment dispersion comprises a normally solid pigment component and an ester of naphthenic acid, having the general formula:

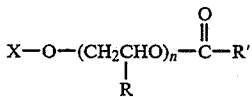

where R'=a naphthene group containing one or more alkylated cyclopentane and/or cyclohexane ring(s), and
where R=H or CH$_3$,
where n=1-6, and
X=H or

* * * * *

UNITED STATES PATENT AND TRADEMARK OFFICE
CERTIFICATE OF CORRECTION

PATENT NO. : 5,437,718
DATED : August 1, 1995
INVENTOR(S) : James L. Carmine, et al.

It is certified that error appears in the above-indentified patent and that said Letters Patent is hereby corrected as shown below:

```
On the title page, item [54] and column 1, line 2, "DISPENSING"
should read --DISPERSING--.
```

Signed and Sealed this

Nineteenth Day of March, 1996

Attest:

BRUCE LEHMAN

Attesting Officer      *Commissioner of Patents and Trademarks*